(12) United States Patent
Ganesh

(10) Patent No.: US 8,768,626 B1
(45) Date of Patent: Jul. 1, 2014

(54) CALCULATING WALKING DIRECTIONS BASED ON A USER'S WALKING ATTRIBUTES AND LOCATION HISTORY

(75) Inventor: Jaikumar Ganesh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 13/533,936

(22) Filed: Jun. 26, 2012

(51) Int. Cl.
*G01C 23/00* (2006.01)
(52) U.S. Cl.
USPC .......................... 701/540; 701/433; 455/456.3
(58) Field of Classification Search
USPC ............ 701/540, 434, 433; 455/456.3; 705/6, 705/7.12
See application file for complete search history.

(56) References Cited

U.S. PATENT DOCUMENTS

| | | | |
|---|---|---|---|
| 7,650,234 B2 * | 1/2010 | Obradovich et al. | 701/412 |
| 7,822,546 B2 * | 10/2010 | Lee | 701/412 |
| 2001/0025222 A1 * | 9/2001 | Bechtolsheim et al. | 701/209 |
| 2006/0004514 A1 * | 1/2006 | Bennett et al. | 701/208 |
| 2009/0157302 A1 | 6/2009 | Tashev et al. | |
| 2010/0268450 A1 * | 10/2010 | Evanitsky | 701/201 |
| 2011/0137907 A1 * | 6/2011 | Ikenoue | 707/740 |
| 2011/0246065 A1 | 10/2011 | Spencer | |
| 2012/0010811 A1 * | 1/2012 | Hamada | 701/468 |
| 2012/0178475 A1 * | 7/2012 | Yasuhara et al. | 455/456.3 |

OTHER PUBLICATIONS

Bohannon, Richard W., "Comfortable and Maximum Walking Speed of Adults Aged 20-79 Years: Reference Values and Determinants"; Oxford Journals, Age and Ageing, Jan. 1997, vol. 26, Issue 1, pp. 15-19.
Bohannon, Richard W., et al., "Comfortable Walking Speed", retrieved from <https://www.nihtoolbox.org/Toolbox%20Test/Comfortable%20Walking%20Speed-Norms%20for%20Adults%20Derived%20Using%20Meta-Analysis.pdf> Oct. 2008, 2 pgs.
"Google Geo Developers Biog: Ain't No Mountain High Enough", retrieved from <http://googlegeodevelopers.blogspot.com/2010/03/aint-no-mountain-high-emough.html>, Mar. 23, 2010, 3 pgs.
Melanson, Mike, "Google Maps API Gets Elevation", retrieved from <http://www.readwriteweb.com/archives/google_maps_api_gets_elevation.php>, Mar. 24, 2010, 2 pgs.

* cited by examiner

*Primary Examiner* — Tan Q Nguyen
(74) *Attorney, Agent, or Firm* — McDermott Will & Emery LLP

(57) ABSTRACT

The disclosed subject matter relates to computer implemented methods for calculating walking directions based on walking attributes and location history of a user. In one aspect, a method includes accessing a user profile and location history of a user. The user profile of the user includes the user's walking attributes. The location history of the user includes the user's location data from respective dates and times. The location data is received from a location-aware device associated with the user. The method further includes receiving a request for walking directions for the user, the walking directions being from a first location to a second location. The method further includes calculating, in response to the received request, walking directions from the first location to the second location, based on the walking attributes of the user and the location history of the user.

3 Claims, 5 Drawing Sheets

US 8,768,626 B1

CALCULATING WALKING DIRECTIONS BASED ON A USER'S WALKING ATTRIBUTES AND LOCATION HISTORY

BACKGROUND

The Global Positioning System ("GPS") is a navigation system that provides location information to devices. GPS-based navigation devices can receive GPS signals from GPS satellites, and can determine based on the received GPS signals, their current location on earth. Based on the determined current location, navigation instructions can be calculated for GPS based navigation devices.

SUMMARY

The disclosed subject matter relates to a computer-implemented method for calculating walking directions based on walking attributes and location history of a user. The method includes accessing a user profile and location history of a user. The user profile of the user includes the user's walking attributes. The location history of the user includes the user's location data from respective dates and times. The location data is received from a location-aware device associated with the user. The method further includes receiving a request for walking directions for the user, the walking directions being from a first location to a second location. The method further includes calculating, in response to the received request, walking directions from the first location to the second location, based on the walking attributes of the user and the location history of the user.

The disclosed subject matter further relates to a system for calculating walking directions based on walking attributes and location history of a user. The system includes a memory which includes instructions for calculating walking directions based on walking attributes and location history of a user, and a processor. The processor is configured to execute the instructions to calculate walking directions based on walking attributes and location history of a user. The processor is further configured to access a user profile and location history of a user. The user profile includes walking attributes of the user. The location history includes locations data from a respective date and time, received from a location-aware device associated with the user. The walking attributes of the user include a walking speed of the user. The processor is further configured to receive a request for walking directions for the user, the walking directions being from a first location to a second location. The processor is further configured to calculate, in response to the received request, walking directions from the first location to the second location, based on the walking attributes of the user and the location history of the user.

The disclosed subject matter further relates to a machine-readable medium including machine-readable instructions for causing a processor to execute a method for calculating walking directions based on walking attributes and location history of a user. The method includes accessing a user profile and location history of a user. The user profile of the user includes the user's walking attributes. The location history of the user includes the user's location data from respective dates and times. The location data is received from a location-aware device associated with the user. At least one of the walking attributes is calculated based on the location history of the user. The method further includes receiving a request for walking directions for the user, the walking directions being from a first location to a second location. The method further includes calculating, in response to the received request, walking directions from the first location to the second location, based on the walking attributes of the user and the location history of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

Figure 1:
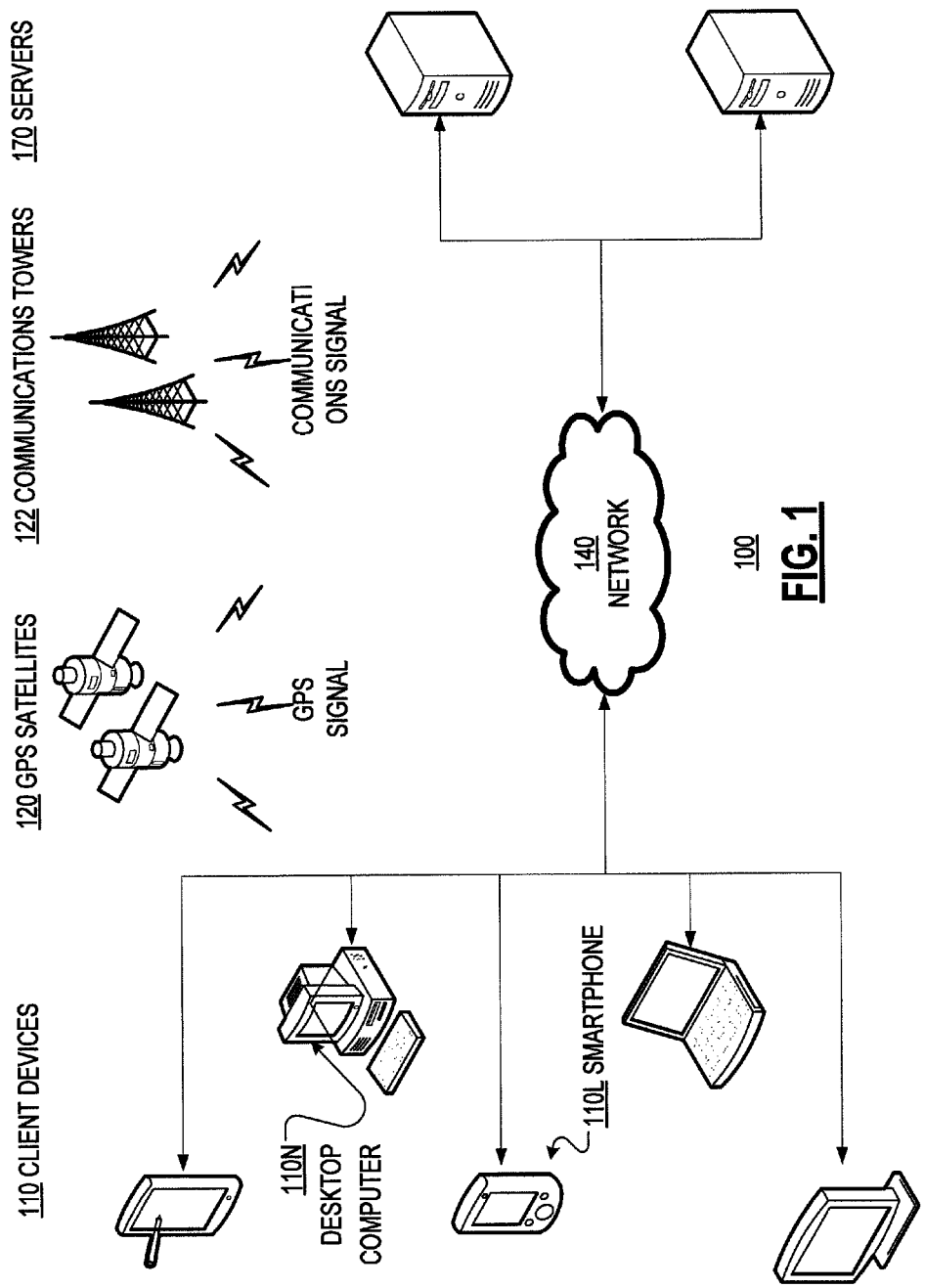
FIG. 1 illustrates an example of an architecture for calculating walking directions based on walking attributes and location history of a user.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Map applications can calculate walking directions from a first location (e.g., an origin location) to a second location (e.g., a destination location). However, the calculated walking directions do not account for a particular individual's walking attributes and location history. For example, the calculated directions do not account for a user's walking route history, which can be determined based on the user's location history. The term "walking attributes" as used herein encompasses its plain and ordinary meaning, including, but not limited to any aspect of the user that has some correlation with the user's walking characteristics. For example, a user's walking speed can be an example of a walking attribute. Similarly, a user's age can be an example of a walking attribute. This is because a user's age can affect the user's walking speed. Other examples of walking attributes include a user's age, weight, height, sex and physical abilities/disabilities.

Walking attributes can include locations that the user avoids visiting. These avoided locations and the characteristics of those avoided locations can be added to the user's walking attributes. Similarly, locations that the user visits frequently can also be added to the user's profile as walking attributes. The frequently visited locations can then be included in the walking directions calculated by the server 170.

Walking attributes can also include data that can be used to for various calculations. For example, a user's walking speed at various points may be used to calculate the user's maximum walking speed, minimum walking speed, median walking speed, average walking speed, and so on. Furthermore, walking attributes can include values that are based on cross-referencing various types of data. As an example, a user's walking speed at various locations can be used to calculate a correlation between a user's walking speed with the elevation and/or the slope at that location.

An aspect of the user that does not have a meaningful correlation with the user's walking characteristics can also be included in the user's profile. However, such aspects of the user's profile would not be considered a walking attribute of the user. As an example, a user's eye color, hair color, name, primary language, and so on would not be considered a walking attribute of the user. If at some point, the other attributes are found to have correlation with a user's walking characteristics, the walking directions module 282 may be updated to treat those other attributes as walking attributes.

The disclosed subject matter relates to calculating walking directions based on the walking attributes and location history of a user.

FIG. 1 illustrates an example of an architecture 100 for calculating walking directions based on walking attributes and location history of a user. The architecture 100 includes client devices 110 and servers 170 connected over a network 140.

The client devices 110 can be, for example, mobile computers, tablet computers, mobile devices (e.g., a smartphone or PDA), or any other devices having appropriate processing capabilities, communications capabilities, and memory. Each client device 110 is configured to include an input device for accepting user input, and an output device to display information to the user.

The client devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

Some of the client devices 110 can be location-aware. The term 'location-aware' as used herein encompasses its plain and ordinary meaning, including, but not limited to any device which is capable of determining its location. For example, a smartphone 110L illustrated in FIG. 1 is capable of determining its location based on a GPS signal received from GPS satellites 120. That is, the smartphone 110L may be considered a location-aware client device.

Location-awareness may be achieved through a variety of location-sensing techniques. For example, the smartphone 110L may be capable of determining its location based on techniques involving triangulation, multilateration, and so on. The location-sensing techniques may be based on and/or applied to communications signals received from communications towers 122. Similarly, the smartphone 110L may be capable of determining its location based on IP geolocation techniques.

While some of the client devices 110 (e.g., the smartphone 110L) may be location-aware, other client devices 110 may not be location-aware. For example, if the client device 110 does not have the requisite hardware (e.g., a GPS receiver) or the requisite software (e.g., for performing IP geolocation techniques), the client device 110 may be not be location-aware. As an example, a desktop computer 110N illustrated in FIG. 1 may not be location-aware.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

It should be noted that regardless of how any information is obtained by the server 170, appropriate efforts may be taken to protect a user's privacy rights. For example, collection of location data may be on an opt-in basis so that data is not collected unless the user has granted permission. Additionally, steps may be taken to anonymize information to protect the user's privacy rights.

Figure 2:
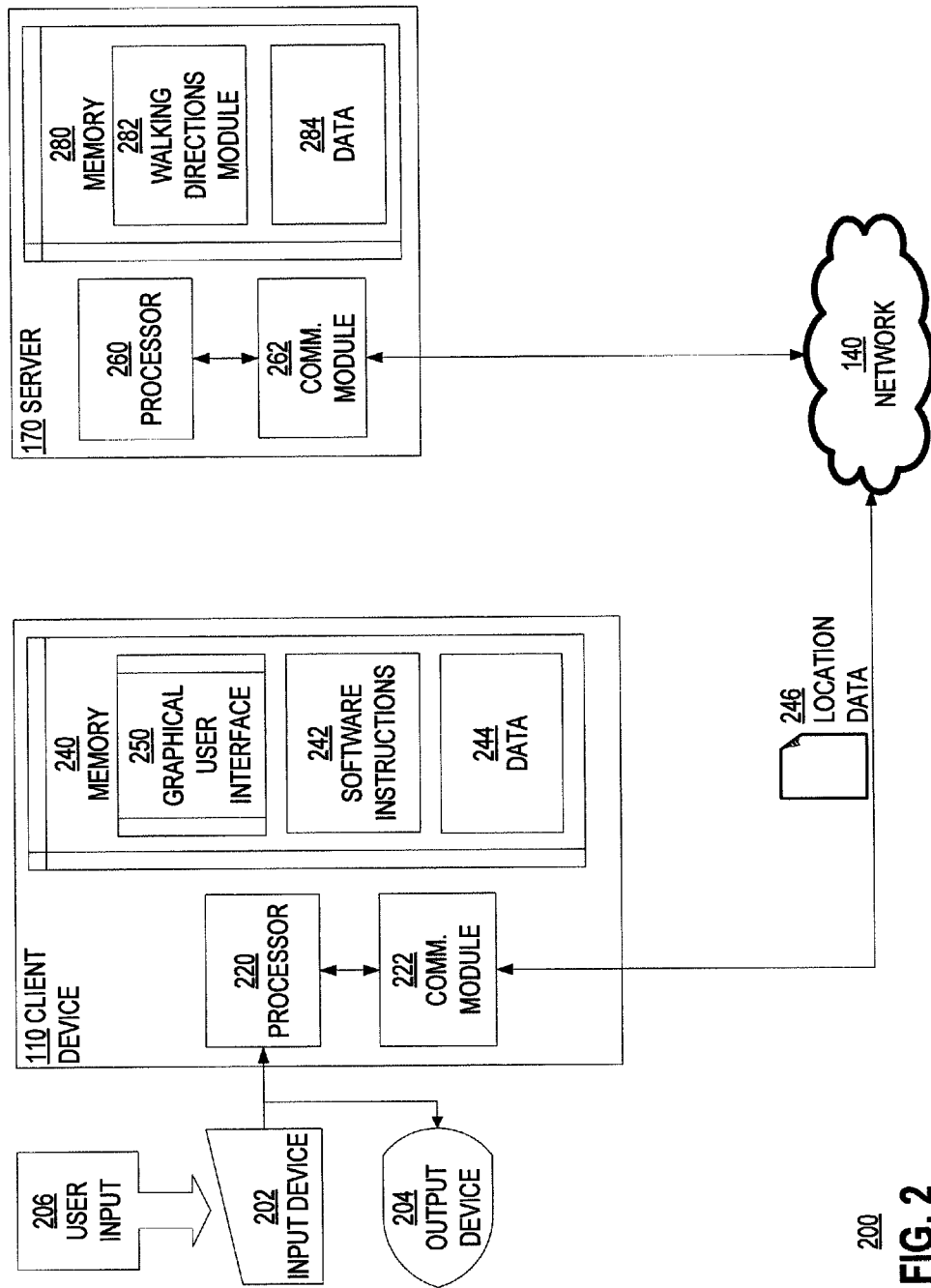
FIG. 2 is a block diagram illustrating an example of a client device and a server from the architecture of FIG. 1.

FIG. 2 is a block diagram 200 illustrating an example of a location-aware client device 110L and a server 170 in the architecture 100 of FIG. 1 according to certain aspects of the disclosure.

The location-aware client device 110L includes an input device 202, an output device 204, a processor 220, a communications module 222, and memory 240. The input device 202 can be a touchscreen, a mouse, a keyboard, or any other device to enable a user to supply input 206 to the client device 110L. The output device 204 can be a display screen. Input 206 received via the input device 202 can be processed locally on the client device 110 and/or the server 170.

The location-aware client device 110L is connected to the network 140 via a communications module 222. The communications module 222 is configured to interface with the network 140 to send and receive information, such as data (e.g., location data 246), requests, responses, and commands to other devices on the network 140. The communications module 222 can be, for example, a modem or Ethernet card.

The memory 240 includes software instructions 242 and data 244 to enable interaction with the server 170. The memory 240 includes a graphical user interface 250 which allows a user to interact with the location-aware client device 110L, and can be used to display information to the user. The graphical user interface 250 may be installed locally at the location-aware client device 110L and/or downloaded from the server 170.

The location-aware module 224 is capable of determining its geographic location using any one or more techniques. For example, the location-aware module 224 may use a GPS signal received from GPS satellites 120 to determine its location. Similarly, the location-aware module 224 may rely on location-sensing techniques (e.g., based and/or applied on communications signals received from communications towers 122) to determine its location. The location-aware module 224 can provide location data 246 (e.g., latitude and longitude information) to the server 170.

The server 170 includes a memory 280, a processor 260, and a communications module 262. The memory 280 includes software instructions that can be read by the processor 260 to implement a walking directions module 282. The walking directions module 282 calculates walking directions based on the walking attributes and location history of the user.

The walking directions module 282 accesses the user profile and location history of the user which are stored as data 284 in the memory 280. The user profile includes walking attributes of the user. The location history includes location data (e.g., 246) from a respective date and time, received from a location-aware device (e.g., 110L) associated with the user.

The location data (e.g., 246) can include various information about a particular location, such as, for example, a latitude, longitude, and/or elevation of a particular location. The location history, which includes location data (e.g., 246) and the respective date and time (e.g., timestamp), can be used to calculate a user's walking route history. Furthermore, the location data (e.g., 246), which includes the elevation of various locations on a particular route, can be used to calculate the elevation changes of that route.

The walking directions module 282 further receives a request for the user for walking directions from a first location (e.g., an origin location) to a second location (e.g., destination location), and calculates in response to the received request, walking directions from the first location to the second location, based on the walking attributes and location history of the user.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions read from the memory 280, or a combination of both. As an example, the processor 260 of the server 170 executes instructions for calculating walking directions based on walking attributes and location history of a user.

Once the instructions from the memory 280 are loaded, the processor 260 is configured to access a user profile and location history of a user. The user profile includes the walking attributes of the user. The location history includes location data (e.g., 246) from a respective date and time, received from a location-aware device (e.g., 110L) associated with the user. The processor 260 is further configured to receive a request for walking directions for the user, the walking directions being from a first location to a second location. The processor 260 is further configured to calculate, in response to the received request, walking directions from the first location to the second location, based on the walking attributes of the user and the location history of the user.

Figure 3:
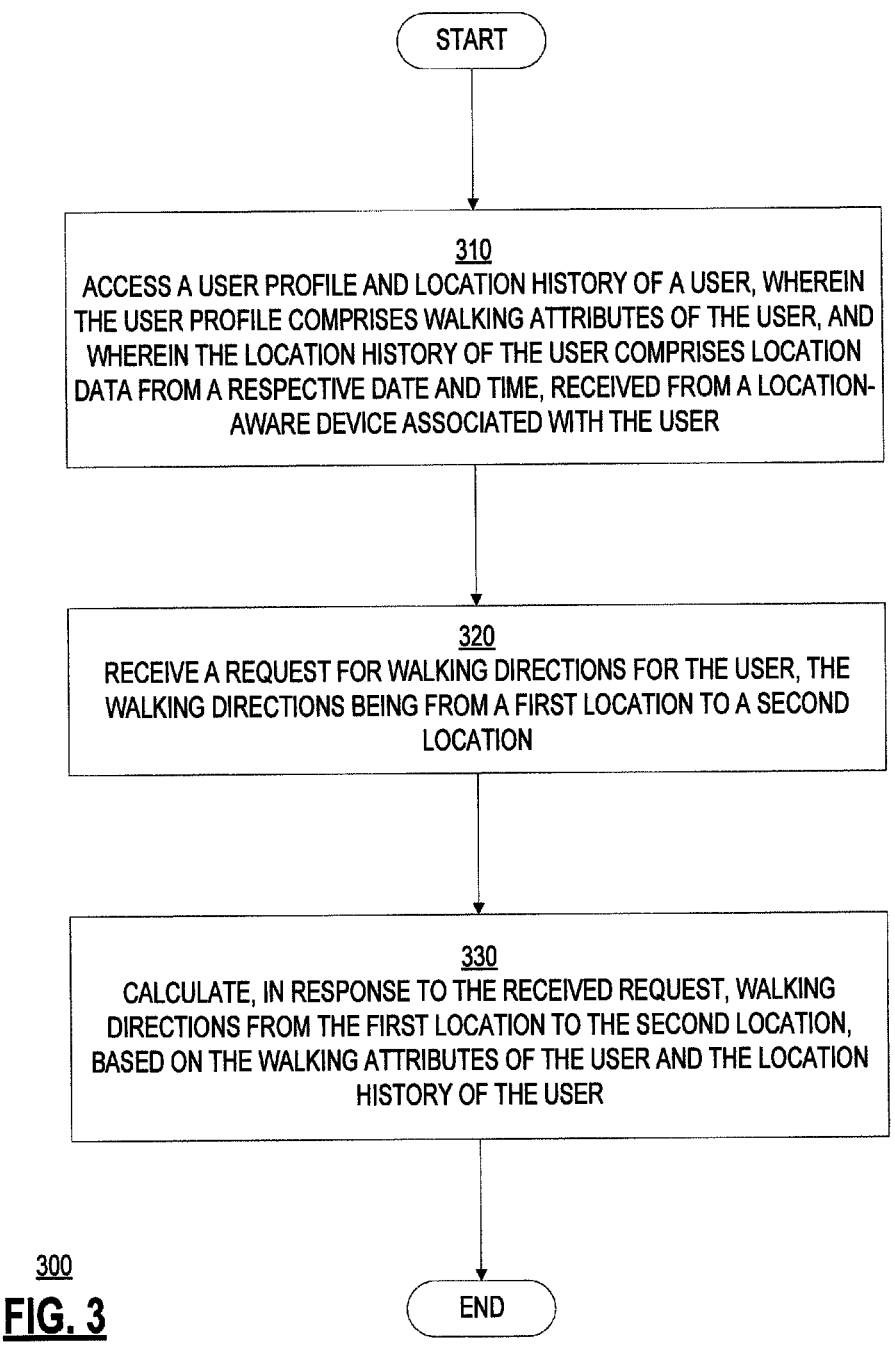
FIG. 3 illustrates an example of a process for calculating walking directions based on walking attributes and location history of a user.

FIG. 3 illustrates an example of a process 300 for calculating walking directions based on walking attributes and location history of a user. It should be noted that although process 300 is described herein with reference to the systems of FIGS. 1 and 2, process 300 is not limited to such, and can be performed by other systems and/or configurations.

In step 310, the user profile and the location history of the user are accessed from the data 284. The user profile includes the user's walking attributes. The walking attributes of the user can include a user's walking speed. The walking speed of the user can be e.g., an average walking speed, a maximum walking speed, a minimum walking speed, a walking speed at a specific location, or a desired walking speed. A desired walking speed is one where the user specifies a particular walking speed that the user at which the user wishes to walk. A desired walking speed may be useful when walking with a companion who walks at a speed different than the user's own walking speed. For example, if the user is walking with an elderly companion who walks at a slower speed, the user can provide a desired walking speed that is lower than his typical (e.g., average) walking speed. Alternatively, the user can identify the companion (e.g., via an interface provided by server 170), and a walking speed for the companion can be set as the desired walking speed. As another example, the desired walking speed may be useful if the user wishes to push himself beyond his typical (e.g., average) walking speed.

The walking speed of a user can be a user-specified value. For example, when the user provides a walking speed (e.g., a desired walking speed), that walking speed is a user-specified value. The walking speed of the user can be calculated. For example, the server can use the location history of the user to calculate the user's speed at specific locations and times. The various walking speeds at various locations can be averaged to calculate the user's average walking speed. The server 170 can also calculate a user's maximum walking speed and minimum walking speed.

The server 170 can calculate a user's walking speed at specific locations. Furthermore, the server 170 can calculate a correlation between the user's walking speed with the elevation and/or the slope at those specific locations. Thus, the server 170 can determine how fast a user can walk at various slopes and/or elevations.

In step 320, a request for walking directions for the user, is received. The walking directions are from a first location to a second location. In step 330, in response to the received request, the server 170 calculates walking directions from the first location to the second location, based on the walking attributes of the user and the location history of the user.

In calculating the walking directions, the server 170 considers the various walking attributes of the user to determine one or more routes that may be appropriate for the user. For example, if a user is typically a slow walker, the server 170 may treat this information as an indication that the user may prefer a path that is less challenging (e.g., because of a gradual slope) than a path that is more challenging (e.g., because of a steep slope). Similarly, the server 170 may use the user's age to make similar initial assumptions when calculating walking directions for that user. As an example, the server 170 may offer walking directions to a 25 year old user, which is more challenging than walking directions calculated for a 65 year old user.

It should be noted that while the server makes certain initial assumptions about the user, the server 170 continually refines the user's walking attributes based on the user's location history.

For example, the server 170 can determine, based on the user's location history, an actual walking route of the user. The server can then compare that actual walking route to the walking directions that the server 170 had calculated in step 320. By comparing the user's location history (e.g., actual walking routes) to the walking directions calculated for the user, the server 170 can detect locations that the user avoids.

The server 170 can add the avoided location to the user's walking attributes. The server 170 can also add characteristics of the avoided location to the user's walking attributes. For example, the server 170 can add to the walking attributes of the user, the elevation and/or slope of the avoided location. Thus, the server 170 can determine whether the user prefers less challenging routes over more challenging routes or vice versa. Similarly, the server 170 can determine whether the user prefers shorter routes that may be more challenging as opposed to longer routes that may be less challenging.

Based on the various calculations, the server 170 can select the various route segments that constitute a route that corresponds to the walking directions calculated by the user. The term "route segment" as used herein, encompasses its plain and ordinary meaning, including, but not limited the shortest walking distance between two points.

A walking route can include a number of route segments. The server 170 can select various route segments to assemble a route based on the user's walking attributes. As an example, the server 170 can select route segments with gradual slopes rather than route segments with steeper slopes, for a user whose walking attributes indicate that the user walks slowly, avoids steep slopes, and/or is elderly.

Figure 4:
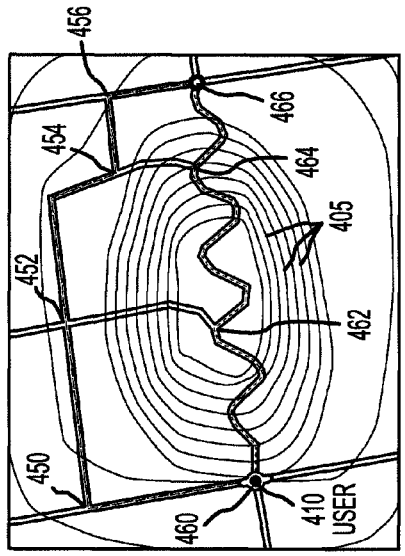
FIG. 4 is an illustration of an example associated with the example of the process of FIG. 3.

An example will now be described using the example of the process 300 of FIG. 3. In this example, illustrated in FIG. 4, a smartphone 110L will be used as the client device 110. In this example, a user 410 at a location 460, wishes to walk to a second location 466. Thus, location 460 will be used as a first location, and location 466 will be used as the second location.

In step 310, the user profile 420 and the location history 440 of the user 410 are accessed. The user profile 420 and location history 440 are stored as data 440 on the server 170. The user profile 420 includes the user's walking attributes 422, and other attributes 424. The walking attributes 422 of the user include the user's age 422A, sex 422AB, height 422C, weight 422D, average walking speed 422E, maximum walking speed 422F, minimum walking speed 422G, average incline 422H, maximum incline 422I, minimum incline 422J, desired walking speed 422K, desired incline 4322L, and so on. Furthermore, the user's walking attributes 420 can include a composite walking score 422M which may be based on one or more walking attributes 420.

In this example, the user's age 422A is indicated by a variable AGE, the user's average walking speed 422E is indicated by a variable AVG_WALKING_SPEED, and the user's average incline is indicated by a variable AVG_INCLINE. The values for the user's 410 average walking speed 422E is calculated based on the user's location history 440. As an example, the server 170 can determine the time it took the user to travel the distance from Location 1 to Location 2. The server can further calculate an incline by using the elevation levels at Location 1 and Location 2. Based on these calculations, the server 170 can determine specific values for the various variables for the walking attributes 422 in the user profile 420 of the user.

This calculation, among other calculations based on location history 440, may be performed in real-time or in advance. In this example, the values have been calculated in advance. Thus, when the server 170 accesses the user profile 420 and location history 440 of the user, the values are pre-calculated, and available for use.

In step 320, a request for walking directions from the first location 460 to the second location 466 is received. The user 410 provides the first location 460 and the second location 466 by providing the cross streets for two locations.

In step 330, in response to the received request, the server 170 calculates walking directions from the first location 460 to the second location 466, based on the walking attributes 420 and the location history 440 of the user 410.

The server 170 begins by calculating various possible travel routes from the first location 460 to the second location 466. The server 170 calculates various travel routes by using various combinations of the underlying route segments. For example, Walking Route 1, one of the routes calculated by the server 170, includes route segments 460-450, 452-454, 454-456, and 456-466. Similarly, Walking Route 2 includes route segments 460-462, 462-464, and 464-466. As an example, another walking route may include the route segments 460-450, 450-452, 452-454, 454-464, and 464-466.

The server 170 then compares whether any particular route segment would be inappropriate for the user 410. For example, Walking Route 2 includes route segment 460-462 which, as indicated by the elevation lines 405, has a slope that is steeper than, for example, route segment 450-452.

Based on the user's walking attributes, some route segments may be more appropriate than others. In this example, the server 170 determines that Walking Route 2 includes route segments that would be too challenging (e.g., due to the steep slopes) for the user. The server 170 can base these calculations, for example, on the values MAX_INCLINE, and AVG_INCLINE.

The server 170 further determines that Walking Route 1 may be more appropriate because the various route segments 460-450, 452-454, 454-456, and 456-466, would be in line with the user's walking attributes 422. That is, although Walking Route 1 involves walking a greater distance than Walking Route 2, the former is less challenging than the latter.

Figure 5:
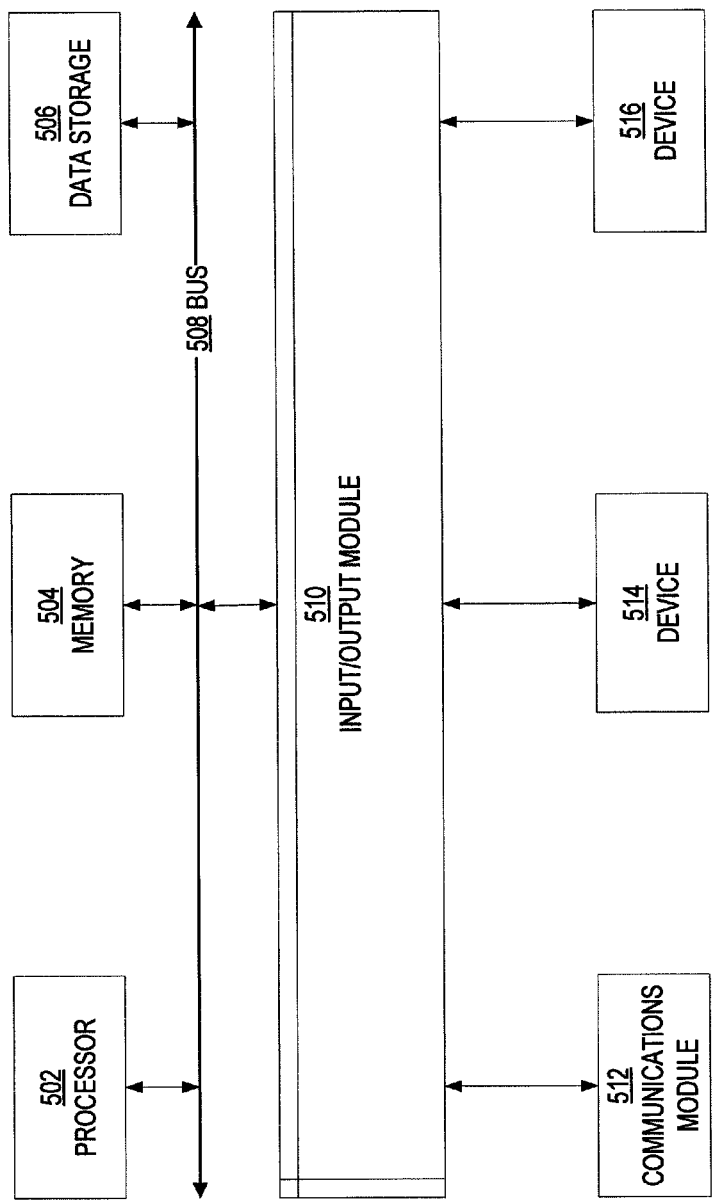
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client devices and servers. A client device and server are generally remote from each other and typically interact through a communication network. The relationship of client device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for calculating walking directions based on walking attributes and location history of a user, the method comprising:
   accessing a user profile and location history of a user, wherein the user profile comprises walking attributes of the user, and wherein the location history comprises location data from a respective date and time, received from a location-aware device associated with the user;
   receiving a request for walking directions for the user, the walking directions being from a first location to a second location;
   calculating, in response to the received request, walking directions from the first location to the second location, based on the walking attributes of the user and the location history of the user;
   determining an actual walking route of the user;
   comparing the actual walking route of the user to the calculated walking directions;
   detecting, based on the comparing, an avoided location; and
   adding to the walking attributes of the user, an elevation of the avoided location.

2. A system for calculating walking directions based on walking attributes and location history of a user, the system comprising:
   a memory comprising instructions for calculating walking directions based on walking attributes and location history of a user; and
   a processor configured to execute the instructions to:
      access a user profile and location history of a user, wherein the user profile comprises walking attributes of the user, wherein the location history comprises location data from a respective date and time, received from a location-aware device associated with the user, and wherein the walking attributes of the user comprise a walking speed of the user;
      receive a request for walking directions for the user, the walking directions being from a first location to a second location;
      calculate, in response to the received request, walking directions from the first location to the second location, based on the walking attributes of the user and the location history of the user;
      determine an actual walking route of the user;
      compare the actual walking route of the user to the calculated walking directions;
      detect, based on the comparing, an avoided location; and
      add to the walking attributes of the user, an elevation of the avoided location.

3. A machine-readable storage medium comprising machine-readable instructions for causing a processor to execute a method for calculating walking directions based on walking attributes and location history of a user, the method comprising:
   accessing a user profile and location history of a user, wherein the user profile comprises walking attributes of the user, and wherein the location history comprises location data from a respective date and time, received from a location-aware device associated with the user, and wherein at least one of the walking attributes is calculated based on the location history of the user;
   receiving a request for walking directions for the user, the walking directions being from a first location to a second location;
   calculating, in response to the received request, walking directions from the first location to the second location, based on the walking attributes of the user and the location history of the user;
   determining an actual walking route of the user;
   comparing the actual walking route of the user to the calculated walking directions;
   detecting, based on the comparing, an avoided location; and
   adding to the walking attributes of the user, an elevation of the avoided location.

* * * * *